United States Patent [19]

Agrawal et al.

[11] Patent Number: 5,734,885
[45] Date of Patent: Mar. 31, 1998

[54] SYSTEM AND METHOD FOR TIGHTLY COUPLING APPLICATION PROGRAMS WITH RELATIONAL DATABASES

[75] Inventors: Rakesh Agrawal; Kyuseok Shim, both of San Jose, Calif.

[73] Assignee: International Business Machines Corporation, Armonk, N.Y.

[21] Appl. No.: 518,875

[22] Filed: Aug. 24, 1995

[51] Int. Cl.$^6$ ............................................. G06F 17/30
[52] U.S. Cl. ..................... 395/603; 395/704; 395/705
[58] Field of Search ............................ 395/600, 603, 395/704, 705

[56] References Cited

U.S. PATENT DOCUMENTS

| | | | |
|---|---|---|---|
| 4,805,134 | 2/1989 | Calo et al. | 364/600 |
| 4,891,785 | 1/1990 | Donohoo | 364/900 |
| 5,210,870 | 5/1993 | Baum et al. | 395/600 |
| 5,317,742 | 5/1994 | Bapat | 395/700 |
| 5,430,644 | 7/1995 | Deaton et al. | 364/401 |
| 5,430,871 | 7/1995 | Janoussi et al. | 395/600 |
| 5,434,963 | 7/1995 | Kuwamoto et al. | 395/155 |
| 5,504,886 | 4/1996 | Chang et al. | 395/600 |

OTHER PUBLICATIONS

Martin Vingron and Patrick Argos, "A Fast and Sensitive Multiple Sequence Alignment Algorithm", *Computer Applications in the Biosciences*, 5:115–122, 1989. (W1.C0528.BML 1st & 2nd Fl.).

M.A. Roytberg, "A Search For Common Patterns in Many Sequences", *Computer Applications in the Biosciences*, 8(i):57–64, 1992.

S. Gatziu and K.R. Dittrich, "Detecting Composite Events in Active Databases Using Petri Nets", *Proceedings of the 4th International Workshop on Research Issues in Data engineering: Active Database Systems*, pp. 2–9, Feb. 1994. (QA76.9D3.1593 1993).

IBM Database 2 Application Programming Guide for Common Servers, Verson 2, pp. 275–304 (1995).

Montage User's Guide, pp. 8–1 through 8–5 (Mar. 1994).

V. Linneman, et al., "Design and Implementation of an Extensible Database Management System Supporting User Defined Data Types and Functions", *Proceedings of the International Conference on Very Large Data Bases*, Amsterdam, The Netherlands, 1988, pp. 294–305.

R. Agrawal, et al., "Mining Association Rules Between Sets of Items in Large Databases", *Proceedings of the ACM SIGMOD Conference on Management of Data*, pp. 207–216, Washington, D.C., May 1993.

Rakesh Agrawal, et al., "Database Mining: A Performance Perspective", *IEEE Transactions on Knowledge and Data Engineering*, 5(6):914–925, Dec. 1993.

R. Agrawal, et al., "Fast Algorithms for Mining Association Rules", Proceedings of VLDM Comference, Santiago, Chile, Sep. 1994, pp. 487–499. (IBM Research Report RJ9839, Jun. 1994).

(List continued on next page.)

*Primary Examiner*—Thomas G. Black
*Assistant Examiner*—Jean M. Corrielus
*Attorney, Agent, or Firm*—Baker, Maxham, Jester & Meador

[57] ABSTRACT

An application program is tightly coupled to a relational database without changing the software of the database management system. A first user defined function (udf) allocates a work area in the address space of the database management system. Then, a second udf embodying the computational steps of the application program undertakes the computational steps within the dbms work area and saves the results in the work area. Importantly, the second udf does not return an answer to the application program during the processing of records, thereby eliminating copying costs and context switch costs. When processing is complete, the results are transmitted to the application program and the work area is released.

15 Claims, 3 Drawing Sheets

OTHER PUBLICATIONS

W. Hasan, et al., "Papyrus GIS Demonstration", *Proceedings of the ACM–SIGMOD International Conference on the Management of Data,* Washington, D.C., pp. 554–555, Jun. 1993.

M. Stonebraker, et al., "The Design of Postgres", *Proceedings of the ACM–SIGMOD International Conference on the Management of Data,* Washington, D.C., pp. 340–355, May 1986.

M. Stonebraker, et al., "The DBMS Research at Crossroads: The Vienna Update", *Proceedings of the VLDB Conference,* pp. 688–692, Dublin, Aug.1993.

M.M. Morsi, et al., "An Extensible Object–Oriented Database Testbed", *Proceedings of the International Conference on Data Engineering,* pp. 150–157, 1992. (QA 76.9 1594).

G. M. Lohman, et al., "Extensions to Starburst: Objects, Types, Functions, and Rules", Communications of the ACM, pp. 95–106, vol. 34, No. 10, Oct. 1991.

SYSTEM AND METHOD FOR TIGHTLY COUPLING APPLICATION PROGRAMS WITH RELATIONAL DATABASES

BACKGROUND OF THE INVENTION

1. Field of the Invention

The present invention relates generally to data processing, and more particularly to computer database mining.

2. Description of the Related Art

As discussed in U.S. patent application Ser. No. 08/415,006, filed Mar. 31, 1995, for "SYSTEM AND METHOD FOR QUICKLY MINING ASSOCIATION RULES IN A DATABASE", and U.S. Pat. Ser. No. 5,615,341 for "SYSTEM AND METHOD FOR MINING GENERALIZED ASSOCIATION RULES IN DATABASES", both of which are commonly assigned with this application and both of which are incorporated herein by reference, knowledge of consumer purchasing tendencies can provide invaluable marketing information for a wide variety of applications. Accordingly, the above-referenced applications disclose systems and methods for mining large relational databases of consumer transactions to ascertain consumer purchasing tendencies, i.e., to mine transaction databases for useful association rules between items in the database.

Mining association rules for consumer purchasing tendencies is an example of but one useful application which accesses a large relational database. In light of the capability to store large amounts of various types of data in enormous relational databases, it will readily be appreciated that many other database application programs have been developed for a wide variety of purposes.

Typically, application programs access the management system of a relational database to retrieve records from the database and then perform user-defined operations on the records. Applications programs ordinarily are written in a general purpose host programming language, such as $C^{++}$, and also include user-defined statements written in a relational query language such as SQL. Details of SQL are set forth in *DB2 Version 2.1 Manual*, published by International Business Machines Corp. of Armonk, N.Y.

Application programs typically contain an SQL statement to retrieve records from the relational database via the associated database management system. A loop in the application program then copies the records one by one from the database access space to the application address space, there to perform the defined operations on the records. In this process, the application is referred to as being "loosely coupled" to the relational database.

Manifestly, a copying cost is incurred each time a record is copied from the database address space to the application address space. Additionally, a context switch cost is incurred each time the operating system switches between the application and the database management system.

Because many previous applications do not require retrieving large amounts of data from a relational database, copying costs mad context switch costs have had relatively little effect on system performance. In other words, loosely coupling many previous applications to relational databases has not resulted in unacceptably high performance degradation. It happens, however, that for applications such as those disclosed in the above-referenced pending patents which require the retrieval of large amounts of data, copying costs and context switch costs become significant, slowing the system and degrading performance. In turn, poor performance deters the use of otherwise valuable relational databases in such applications.

One way to reduce copying costs and context switch costs is to write the desired application directly into the software of the relational database, thereby effectively merging the application with the database. As the skilled artisan will recognize, however, such a brute force approach would undesirably require changing the software of every relational database system sought to be used in conjunction with the particular application. Stated differently, a single application program could not be universally used, but instead would require tailoring for each database system which is to be used by the application.

Accordingly, it is an object of the present invention to tightly couple an application program with a relational database which does not require changes to the relational database software. Another object of the present invention is to couple an application program with a relational database while minimizing copying costs and context switch costs. Yet another object of the present invention is provide a method and apparatus for coupling an application program with a relational database, which is easy to use and cost-effective.

SUMMARY OF THE INVENTION

The invention is found in a procedure or a means that causes a database management system (dbms) having an address space to access a relational database.

This invention supports the performance of computations by an application program in the address space of the dbms, although the application program is not part of the dbms software.

The method steps of this invention include causing the dbms to retrieve a record from the database and processing the record in accordance with the application program to generate a result. The result is stored in a results set in the address space of the dbms without returning the result to the application program. As intended by the invention, the steps above are iteratively repeated until a plurality of records have been processed and accumulated in the dbms address space. After the records have been processed, the results set is transmitted to the application program.

In a preferred embodiment, the processing step includes executing a first user-defined function (udf) which allocates and initializes a work area in dbms address space and returns a handle fox the work area to the application program. As conceived by the inventors, this udf is executed once by the dbms and so is defined over a one-record table.

Preferably, a second udf is recursively executed during the causing step in the work area in the allocated address space of the dbms without returning to the application program. As conceived by the inventors, the transmitting step includes executing a third udf for transmitting the results set to the application program. A fourth udf may be employed to release the work area allocated by execution of the first udf.

In another aspect of the invention, a digital processing apparatus includes a database management system (dbms) having a dbms address space and a relational database that is accessible by the dbms. Computer readable code means are provided for executing a set of user defined functions (udfs) which embody operational steps of an application program. Execution of the set of udfs causes the dbms to generate a results set without transmitting the results set to the application program until all results have been accumulated in the results set. When execution of the set of udfs results is completed, the results set is provided to the application program.

In yet another aspect of the invention, a system is disclosed for executing at least one operational step of an application program in address space of a relational database system. The software of the database system does not incorporate the application. In accordance with the invention, the system includes a user-defined allocator for allocating a work area in the address space of a dbms. Moreover, the system of the present invention includes a executor which recursively executes a user-defined function that completes the operational step for processing records in the allocated space of the database system and generates a results set. The executor causes the results set to be stored in the allocated address space of the dbms without transmitting the results set to the application. A transmitter receives the results set from the executor after record processing and then transmits the results set to the application.

In a particular embodiment, the invention is embodied as a computer program product including a computer readable storage device with a computer program used to direct a digital processing apparatus to tightly couple an application program to a relational database. Indeed, a digital processing apparatus itself is disclosed herein whose actions are directed by the computer program product to perform specific operational steps. As intended by the present invention, the program device is realized in a critical machine component that causes the digital processing apparatus to perform method steps to tightly couple an application program to a relational database management system.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

DETAILED DESCRIPTION OF THE PREFERRED EMBODIMENTS

This invention enables the performance of operations that are defined by an application program ("application") on records contained in a relational database. Importantly, the invention performs the operations in the address space of the database management system and not in the application address space, thereby saving copying costs and context switch costs. Advantageously, the invention does not require changes to the database management system software, provided that the database management software supports user-defined functions that may be referenced in the application.

Figure 1:
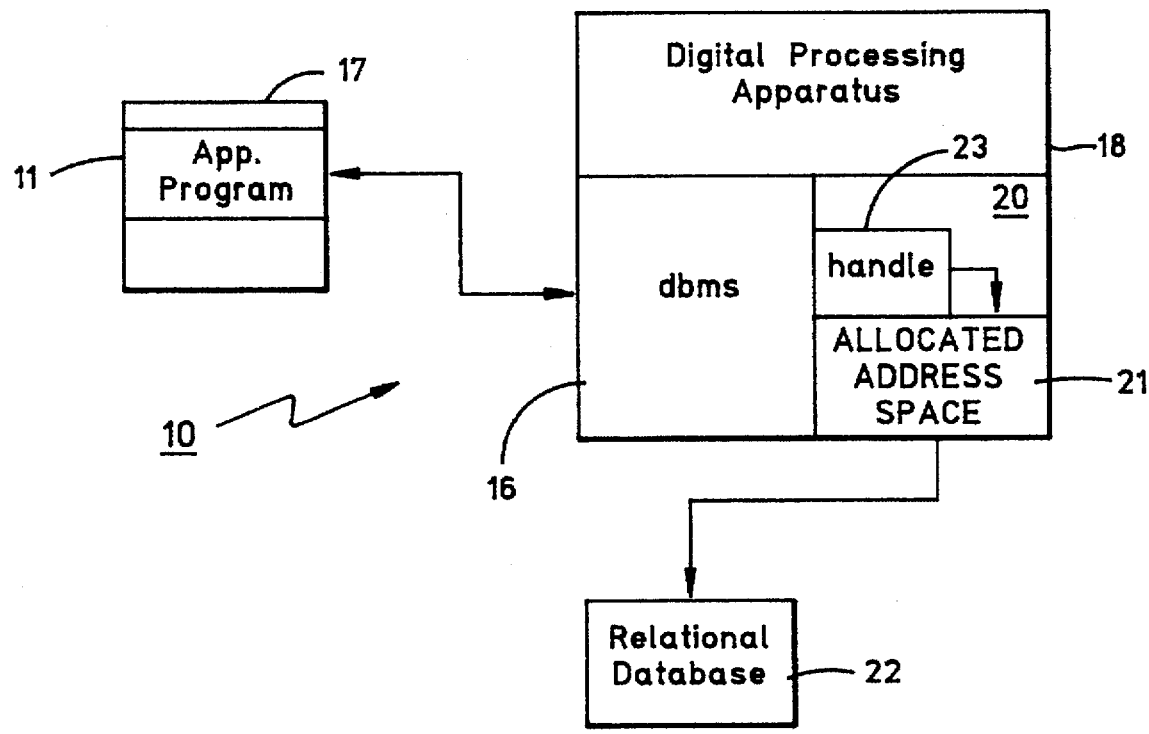
FIG. 1 is a schematic block diagram of the system for tightly coupling a computer application program to a relational database of the present invention.

Referring initially to FIG. 1, a system for tightly coupling an application program to a relational database without changing the database software is shown, generally designated 10. More particularly, as disclosed in detail herein, the system 10 uses user-defined functions of a relational query language, preferably SQL, to selectively "push" portions of the application program which access records and perform computations thereon into a database management system ("dbms"), without changing the software of the dbms.

When used herein, the term "tightly coupled" means that strong dependencies exist—or come into existence—between the application program and the dbms. Such dependencies include stored data and shared address space in the preferred embodiment.

Figure 2:
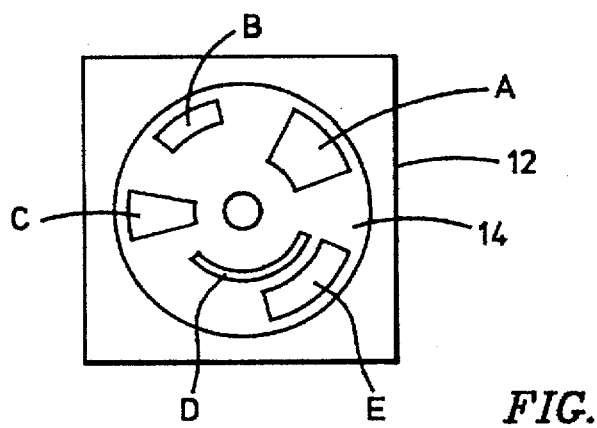
FIG. 2 illustrates a machine component embodying the present invention for illustration.
Figure 3:
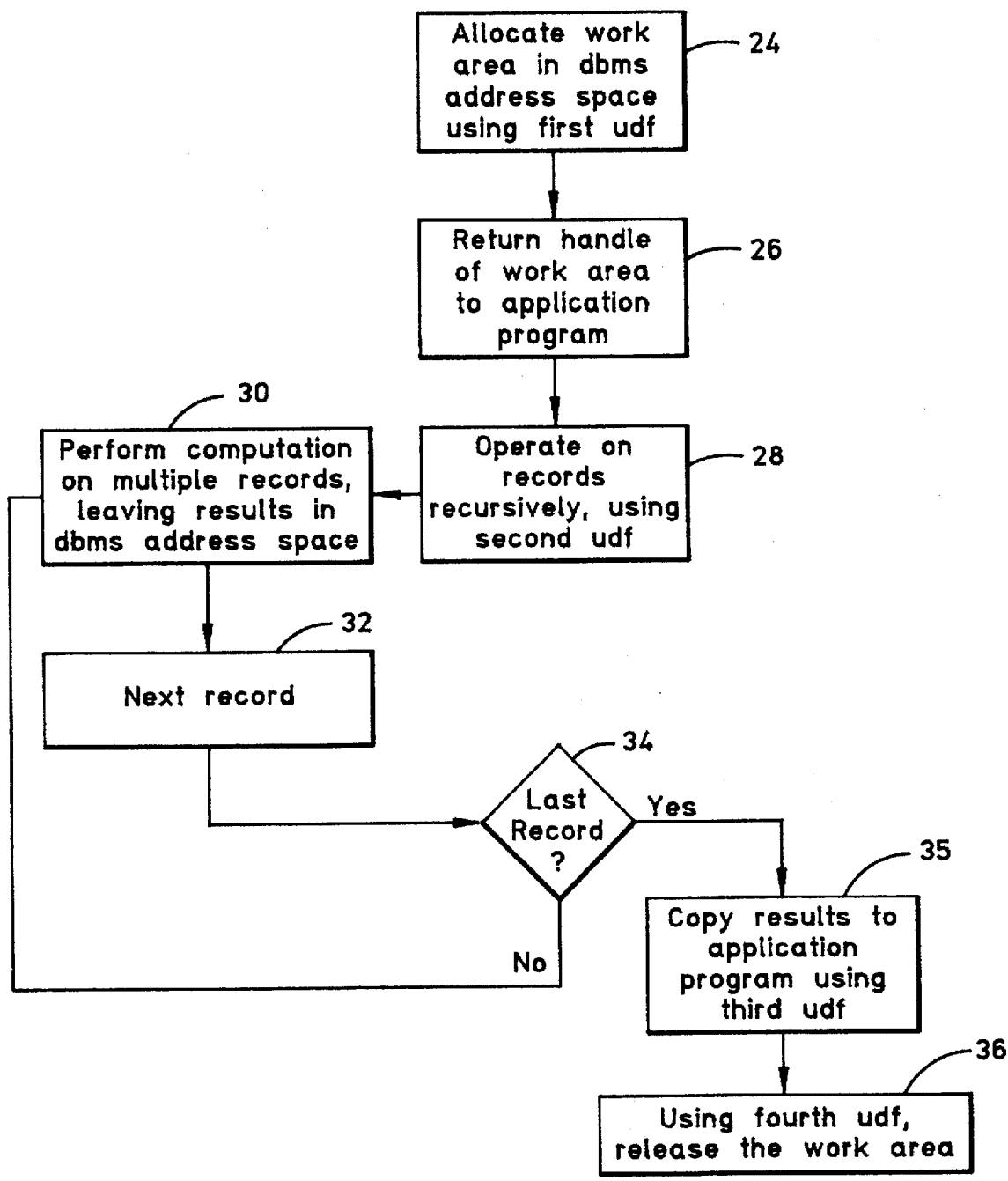
FIG. 3 is a flow chart showing the general operation of the present invention in executing, in the address space of a relational database server, operational steps set forth in an application program.
Figure 4:
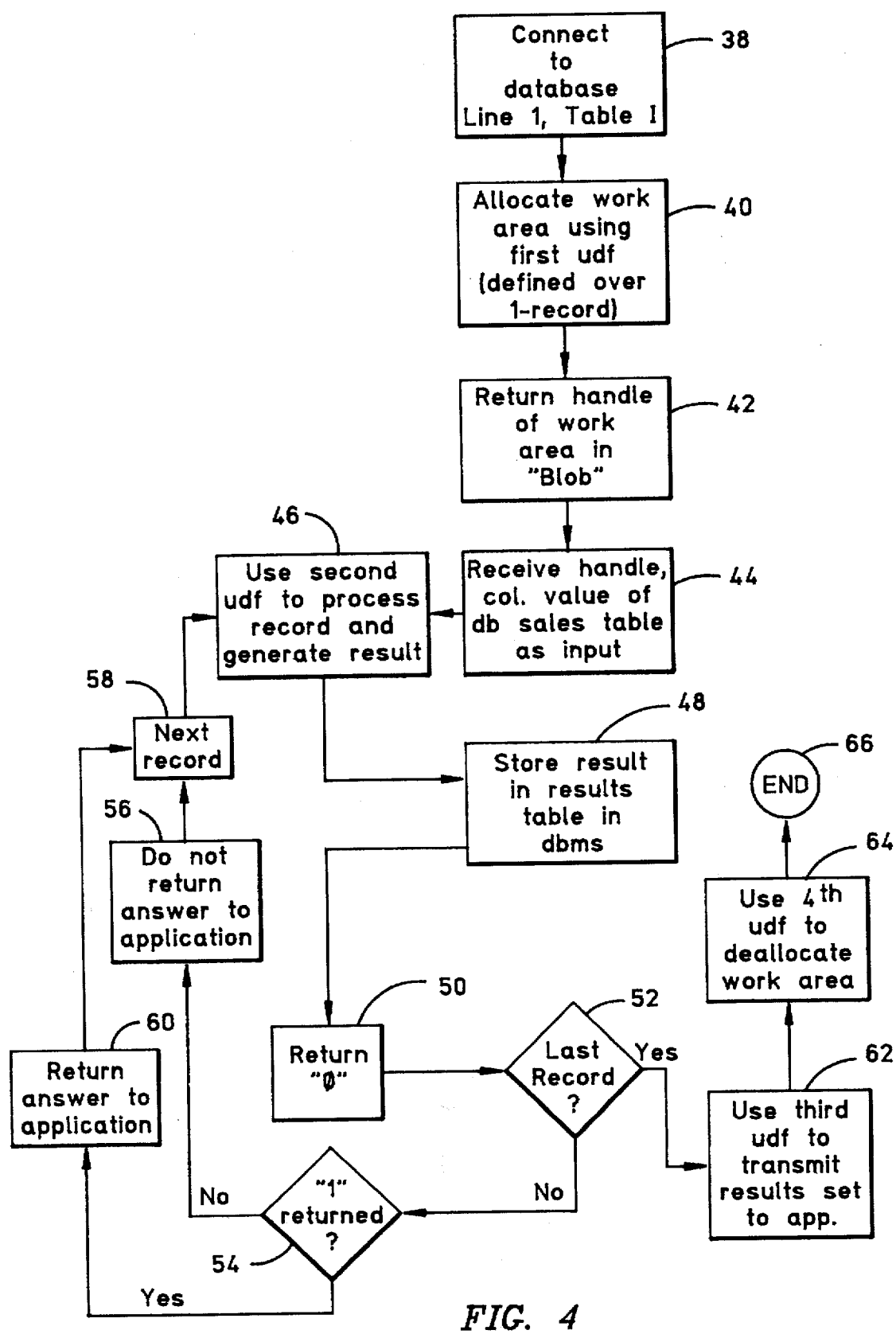
FIG. 4 is a flow chart showing one example of the present invention in executing, in the address space of a relational database server, operational steps set forth in an application program.

In the particular architecture shown, the system 10 includes a tightly coupled application program 11 which can be stored on a computer-readable storage device, e.g., a computer diskette 12 shown in FIG. 2. FIGS. 3 and 4 illustrate the structure of the tightly coupled application program of the present invention as embodied in computer program software stored in the computer-readable storage device. Those skilled in the art will appreciate that the Figures illustrate the structures of computer program code elements that function according to this invention. Manifestly, the invention is practiced in one essential embodiment by a machine component that renders the computer program code elements in a form that causes a digital processing apparatus (that is, a computer) to perform a sequence of operational steps corresponding to those shown in the Figures.

These instructions may reside on a program storage device including a data storage device, such as the computer diskette 12 shown in FIG. 2. The machine component is shown in FIG. 2 as a combination of program code elements A–E in computer readable form that are embodied in a computer-usable data medium 14, on the computer diskette 12. Alternatively, such media can also be found in semiconductor devices, on magnetic tape, on optical disks, on a DASD array, on magnetic tape, on a conventional hard disk drive, on electronic read-only memory or on electronic ransom access memory, or other appropriate data storage device. In an illustrative embodiment of the invention, the computer-executable instructions may be lines of compiled C++ language code.

As shown, the application program 11 is coupled to a database management system (dbms) 16 installed on and executed by a digital processing apparatus 18. Preferably, the digital processing apparatus is a server, and the application program 11 is executed on a separate digital processing apparatus, 17 running as a client. However, this is not meant to limit the scope of the invention since the inventors contemplate that the application program and dbms could execute on the same digital processing apparatus.

The dbms 16 includes address space 20 in a memory, and the dbms 16 is driven by appropriate dbms software for accessing a relational database 22 which, together with the dbms 16, establishes a database system. In one presently preferred embodiment, the digital processing apparatus 17, 18 each may include a type RS\6000 250 workstation made by IBM Corp. of Armonk, N.Y. In the preferred embodiment, the digital processing apparatus 18 has a central processing unit (CPU) clock rate of eighty megahertz (80 MHz) and sixty four million bytes (64 MB) of main memory, and uses an operating system sold under the trademark level 3.2.5. The dbms 16 can advantageously be the product marketed under the tradename DB2/CS, Version 2.1 which supports user-defined functions.

In any case, the application program 11 is not part of the software of the dbms 16. Rather, the application program 11 is separate from the dbms 16 software, and communication is established between the application program 11 and the dbms 16 to undertake the processes described below.

Accordingly, because of the novel present invention, the application program 11 is tightly coupled to the dbms 16 as discussed further below, without requiring changes to the software of the dbms 16.

It is to be understood that the application program 11 can be any suitable application program which processes records contained in the relational database 22 to output a results set. For example, the application program 11 can be the Apriori program disclosed in the above-referenced patent applications and modified under the principles of the present invention, and the database 22 can contain records of consumer transactions. As disclosed the above-referenced patent applications, such an application program can access records in the database 22 to generate association rules between itemsets in the transactions that are stored in the database 22. As stated above, however, the principles disclosed herein can be applied to a wide variety of application programs which require access to relational databases, provided the associated dbms supports user defined functions (udf).

FIGS. 1 and 3 illustrate the general operations of the present invention which execute, in the address space 20 of the dbms 16, operational steps set forth in the application program 11. Commencing at block 24, a work area 21 is allocated in the address space 20 using, in the preferred embodiment, a user defined function (udf) recited in SQL language terms. Specifically, a first SQL "select" udf is invoked over a one-record table and this udf is used to allocate the work area 21, initialize data structures, and generate a handle 23. Thus, block 24 is an allocator for allocating a work area in the address space 20.

Next, at block 26, the handle 23 (i.e., name/location of the work area 21) is returned to the application program 11. Then, at block 28, a second udf that incorporates the desired application computation is invoked using a "where" clause of another SQL "select" clause. The second udf recursively performs the desired operations of the application program 11 over the records in the database 22 by moving to block 30 and selecting the next record to be tested. Importantly, after computation on each record, the second udf accumulates the results of the computation in the work area 21, without returning to the application program 11.

Thus, while records in the database 22 are operated on by the second udf invoked at block 28 and the work area in the address space 20 is updated as a result, no return is made to the application program 11 until the recursive process is complete. Consequently, during the recursive process no copying of data from the address space 20 of the dbms 16 to the address space of the application program 11 is performed, and thus no copying costs are incurred. Furthermore, no context switching between the dbms 16 and the application program 11 is performed. Consequently, no context switching costs are incurred.

Accordingly, blocks 28 and 30 establish an executor for executing a user-defined function incorporating at least one operational step of the application program 11 to process records in the database 22. Also, block 30 generates a results set and causes the results set to be stored in the allocated dbms address space 21 without transmitting the results set to the application program 11.

Proceeding to block 32, another record in the database 22 is retrieved, and then at decision block 34 it is determined whether the last record has been tested. If not, the process loops back to block 30. On the other hand, when it is determined at decision block 34 that all records have been tested, the program moves to block 35.

At block 35, the program 11 uses a third udf in an SQL "select" statement to copy the results in the address space 20 of the dbms 16 over an apparent one-record table to the application program 11. Thus, the application program 11 receives the results of the computations set forth by it and performed in the work area 21, without requiring context switching back and forth between the application program 11 and the dbms 16 during the computation process. It will be appreciated that block 35 is essentially a transmitter for receiving the results set from the function executor after record processing and then transmitting the results set to the application program 11. From block 35. the program moves to block 36 to use a fourth udf in an SQL "select" statement over a 1-record table to deallocate the work area in the address space 20 of the dbms 16.

For some applications, a plurality of udfs may be sequentially invoked at block 28 to accomplish the desired computation. In such a case, the initial udf leaves a handle to the desired data structures in the work area for use by a next udf. The next udf likewise leaves a handle to the desired data structures in the work area for use by a following udf, and so on.

Table I illustrates a tightly-coupled application program according to the invention. The table illustrates, by a pseudo-code presentation, a computer program as would be stored in a computer program product such as the diskette 12 shown in FIG. 2. The computer program includes four udfs, each invoked in a respective SQL "select" statement. As is known, the "select" statement, when used interactively in a system of query language (SQL) program retrieves multiple rows from a table.

TABLE I procedure AlgorithmTC()
begin
   1.     exec sql connect to database;
   2.     exec sql select allocSpace (MAXSIZE) into :blob
            from onerecord;
   3.     exec sql select *
            from sales
            where updateCount(:blob, TID, ITBMID) = 1;
   4.     exec sql select getResult(:blob) into :resultBlob
            from onerecord;
   5.     update the array count[MAXSIZE] using resultBlob;
   6.     exec sql select deallocSpace(:blob)
            from onerecord;
   7.     print count array;
end FIG. 4 is a flow diagram illustrating the process flow of the computer program illustrated in Table I. Assume that tile computer program executes in the system of FIG. 1.

In the diagram of FIG. 4, the application program 11 retrieves sales records in the database 22 and counts how many customers bought each item sold. The name of tile computation function of the application program 11 is "updateCount". The database 22 includes a table (titled "sales") having at least two columns, e.g., TID (transaction id), ITEMID (itemid).

Commencing at block 38, the application program 11 is connected to the database 22 via the dbms 16 using an SQL, "connect to" statement in line 1 of Table I. Next, at block 40, the work area 21 within the address space 20 of the dbms 16 is allocated using a first udf defined over a single record table.

In SQL, syntax, the first udf (termed herein "allocSpace") which allocates the work area is initially defined as shown in Table II:

TABLE II

| | |
|---|---|
| (1) | create function allocSpace (int) |
| (2) | returns int |
| (3) | external name [library/directory/name of udf] |
| (4) | language C++ parameter style db2sql |
| (5) | not variant no sql no external action |
| (6) | not fenced |

In line 1 of Table II, the function is initialized by name, and in line 2 it is specified that an integer is returned by the function. In line 3, the external reference name for the function is established. Line 4 establishes the programming language and database management system/language in force. In contrast, the "not variant" phrase in line 5 specifies that the function always returns the same result for the same input argument value. The "no SQL" phrase indicates that the function itself does not contain any SQL statement. SQL statements are not allowed inside udfs by the DB2 database system. Moreover, the "no external action" clause indicates that the function takes no external action, such as sending messages. Importantly, the phrase in line 6 indicates that the function should run in the address space 20.

After the first udf completes, the handle of the work area is returned at block 42, where "blob" is the handle of an integer array of MAXSIZE elements for holding an intermediate state of computation in the address space 20 of the dbms 16.

Because the first udf is to be executed only once, the "select" statement in Table I, line 2, has been defined over a one-record table. It is to be understood that the "onerecord" table need not be permanent, but may be dynamically created by changing the "from" clause to "from (values(1)) as onerecord". Consequently, the lone record from the defined table will be selected and the udf executed for this record, and this record only. The space for the array "blob", however, is now allocated at block 40 and its handle returned at block 42. As the skilled artisan will recognize, the value in the variable "blob" need have no meaning in the address space of the application program 11, because it is not referenced there. Instead, it is merely passed on to block 44, along with the column values of the database 22, as an input argument to the next udf invoked in the address space 20 of the dbms 16.

At block 46, in the particular example shown a second udf, embedded in the "where" clause of line 3, Table I, is invoked to process each record to be tested and generate a result using the illustrated SQL, syntax.

In the syntax of the "select" statement of Table I, line 3, the asterisk indicates that a process is being defined for operation over all columns of the data table in the database 22. The "from sales" clause indicates the table name (i.e., "sales" in the example given) to be accessed in the database 22. Importantly, the "where" clause names the udf to be used (in this case, "updateCount") and the table columns on which it is to be used (TID) and ITEMID), and further that no return is to be made to the application program 11 unless the udf return is "1". Importantly, the udf always returns zero. Since the selection condition is that the value being returned is 1, the condition is never satisfied and the dbms will execute the second udf over every record in the sales table, and this SQL statement never returns a record to the application program. It is to be understood that the "updateCount" function is an illustrative example, and that other user-fined syntax functions can be used, depending on the particular application program 11, without departing from the principles of the present invention.

Thus, the "result" of the second udf at block 46 is to update the work area 21 of the address space 20 of the dbms 16 by, in the example shown, updating the results set established by the item count array "blob" at block 48; the "return" it makes at block 50 is always "0". From block 50, the method proceeds to decision block 52 to determine whether the last record has been processed, and if not proceeds to decision block 54 to determine whether a "1" has been returned by the second udf. As discussed above, the outcome of the test at decision block 54 is always negative. Thus, the method always moves to block 56 without a return to the application program 11. From block 56, the method moves to block 58 to fetch line next record. The method never moves to block 60 to return an answer to the application program 11 during the recursively-performed computation process. From block 58, the method recursively loops back to block 46.

After the last record has been tested, evacuation of the second udf ceases and the method moves from decision block 52 to block 62, wherein a third udf is invoked to transmit the results set to the application program 11. The third udf is denoted as "getResult" in line 4 of Table I.

The "getResult" function is defined using SQL principles mentioned above and known in the art to transmit the results set "blob" in the address space 20 of the dbms 16 to the address space ("resultBlob") of the application program 11. To ensure this third udf is executed only once, it is referenced to a onerecord table under principles previously discussed.

Next, a fourth udf, deallocSpace(:blob) in line 6 of Table I, also referenced to a one-record table, is used at block 64 to deallocate the work area 21. After deallocating the work area, the method terminates at end state 66.

User-Defined Functions in DB2/CS

In DB2/CS, user-defined functions are completely analogous to the built-in scalar functions except that they are defined and implemented by the users in a general-purpose programming language. Users can register a user-defined function via a create function statement, which describes the function, its input arguments, return value, and some other attributes. The executable of a user-defined function is stored at the database system server site so that database system can access and invoke the function whenever the function is referenced in a SQL statement. DB2/CS does to allow SQL, statements inside a user-defined function.

The user-defined functions are normally kept in the subdirectory sqllib/function of the directory in which DB2/CS has been installed. More than one user-defined function can be kept in a library in this directory and there can be more than one library. Assume that the user-defined function, called allocSpace(), is written in C++. If this function is in a library called mineudf, the function can be named as follows:

external name ' sqllib/function/mineudf!allocSpace'

General Methodology

In summary, our invention for tightly coupling application programs to database systems has the following ingredients:

Employ two classes of user-defined functions:
  those that are executed once within the database system;
  those that are executed once for each selected record.

The former are used for allocating and deallocating workarea in the address space of the system and copying results from the database address to the application address space. The latter do computations on the selected records in the database address spacing, using the work area allocated earlier.

to execute a user-defined function once, reference it in the select list of a SQL select statement over a one-record table. Create this temporary one-record table dynamically by using the construct (value(1)) as onerecord in the from clause.

To execute a user-defined function once for each selected record without ping-ponging between the database address space and the application address, have the function always return 0. Define the SQL select statement over the table whose records are to be processed, and add a condition of the form udf()=1 in the where clause. If there are other conditions in the where clause, this condition must be evaluated last because the user-defined function must be applied only on the selected records.

If a computation involves using user-defined functions in multiple SQL select statements, they share data-structures by creating handles in the work area initially created.

Specifically, our invention consists of the following steps:

Allocate work area in the database address space utilizing a user-defined function in a SQL, select statement over a one-record table. A handle to this work area is returned in the application address space using the into clause.

Setup iteration over the table containing data records and reference the user-defined function encapsulating the desired computation in the where clause of the select statement as discussed above. Pass the handle to the work are as an input argument to this user-defined function. IF the computation requires more than one user-defined function (and, hence, multiple select statements), have the previous one leave a handle to the desired data structures in the work are.

Copy the results from the work are in the database address space into the application address space using another user-defined function in a SQL select statement over a one-record table.

Use another user-defined function over a one-record table in a SQL select statement to deallocate the work are.

Our invention can be cast in the object-oriented programming paradigm. Relatedly, think of allocSpace() as a constructor for an object whose data members store the state of the application program in the address space of the database system. A collection of member functions (e.g., updateCount() and getResult() save and query the state of the application program. The function deallocSpace() can be thought of as the destructor for the object.

Note that our invention does not require changes to an existing relational database system as long as it supports user-defined functions. We simply utilize user-defined functions in SQL in a novel way. In effect, we are using SQL to orchestrate the execution of the application logic within the database system using SQL also as an inter-process communication mechanism. This use of the user-defined functions is quite different from the earlier state, such as for applying a complex selection predicate on record-by-record basis with no residue between executions on two records for integrating specialized data managers with the relational database systems.

While the particular system and method for tightly coupling application programs with relational databases as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A digital processing apparatus, comprising:
   a database management system having a database address space;
   a relational database accessible by the database management system;
   first computer readable code means for generating a user defined function (udf) embodying operational steps of an application program;
   second computer readable code means for tightly coupling the database management system with the application program by:
   causing the database management system to execute the udf and thereby generate a results set without transmitting the results set to the application program;
   storing the results set in the database address space; and
   third computer readable code means for transmitting the results set to the application program.

2. The digital processing apparatus of claim 1, wherein the udf is a first udf, and the second computer readable code means is further for executing a second udf to allocate a work area in the database address space.

3. The digital processing apparatus of claim 2, wherein the results set is a one-record table, and the third computer readable code means includes computer readable code means for executing a third udf for transmitting the results set to the application program.

4. A computer-implemented method for performing method steps of an application program in an address space of a relational database system not including the application program, comprising the steps of:
   (a) retrieving into the address space of the relational database system a record from the database system;
   tightly coupling the relational database system with the application program by:
   (b) processing the record in the address space of the relational database system in accordance with the application program to generate a result;
   (c) storing the result in a results set in the address space of the relational database system; and
   (d) repeating steps (a)–(c) until a plurality of records have been processed; and then,
   (e) transmitting the results set to the application program.

5. The computer-implemented method of claim 4, further including the step of executing a first user-defined function (udf) incorporating at least a portion of the application program and accessing the first udf with the database system.

6. The computer-implemented method of claim 5, wherein the first udf never returns an answer to the application program.

7. The computer-implemented method of claim 6, further comprising the step of executing a second udf to allocate a work area in the address space of the database system.

8. The computer-implemented method of claim 7, wherein the results set is a one-record table, and the method includes executing a third udf for transmitting the results set to the application program.

9. A system for executing at least one operational step of a computer application in an address space of a relational database system having software not incorporating the application, comprising:

an allocator for allocating a work area in the address space of the relational database system;

a function executor for tightly coupling the relational database system with the application by:

executing a user-defined function incorporating the at least one operational step for processing records in the database system and generating a results set and causing the results set to be stored in the address space of the relational database system without transmitting the results set to the application;

and, a transmitter for receiving the results set from the function executor after record processing and then transmitting the results set to the application.

10. A computer program device comprising:

a computer program storage device readable by a digital processing system; and an application program on the program storage device and including instructions executable by the digital processing system for tightly coupling, the database management system with the application program by performing method steps for causing an associated database management system having an address space to access a relational database and perform computations in the address space of the database management system in response to the application program, the application program not being part of the database management system software, the method steps comprising:

(a) causing the database management system to retrieve a record from the database;

(b) processing the record in accordance with the application program to generate a result;

(c) storing the result in a results set in the address space of the management system without returning the result to the application program;

(d) repeating steps (a)–(c) until a plurality of records have been processed; and (e) transmitting the results set to the application program.

11. The computer program device of claim 10, wherein the processing step includes executing a first user-defined function (udf) incorporating at least a portion of the application program and accessing the database management system with the first udf.

12. The computer program device of claim 11, wherein the first udf never returns an answer to the application program.

13. The computer program device of claim 12, further comprising the step of executing a second udf prior to the causing step to allocate a work area in the address space of the database management system.

14. The computer program device of claim 13, wherein the results set is a one-record table, and the transmitting step includes generating a third udf for transmitting the results set to the application program.

15. The computer program device of claim 10, further comprising the digital processing apparatus.

* * * * *